United States Patent
Hosogane et al.

(10) Patent No.: US 7,581,940 B2
(45) Date of Patent: Sep. 1, 2009

(54) COOKED RICE MOLD APPARATUS

(75) Inventors: Takashi Hosogane, Machida (JP); Yoichi Goto, Machida (JP)

(73) Assignee: Kabushiki Kaisha Audio-Technica, Machida-Shi, Tokyo (JP)

( * ) Notice: Subject to any disclaimer, the term of this patent is extended or adjusted under 35 U.S.C. 154(b) by 0 days.

(21) Appl. No.: 12/068,784

(22) Filed: Feb. 12, 2008

(65) Prior Publication Data

US 2008/0206389 A1 Aug. 28, 2008

(30) Foreign Application Priority Data

Feb. 28, 2007 (JP) .............................. 2007-050078

(51) Int. Cl.
 *A23L 1/10* (2006.01)
(52) U.S. Cl. .................... 425/324.1; 425/328; 425/335; 425/367
(58) Field of Classification Search ............. 425/324.1, 425/328, 335, 363, 367
See application file for complete search history.

(56) References Cited

U.S. PATENT DOCUMENTS

| | | | | |
|---|---|---|---|---|
| 2,699,737 | A | * | 1/1955 | Sticelber ...................... 425/363 |
| 4,597,731 | A | * | 7/1986 | Suzuki .................... 425/324.1 |
| 6,001,403 | A | * | 12/1999 | Kobayashi .................. 425/335 |
| 6,352,020 | B2 | * | 3/2002 | Uchida et al. .............. 99/450.6 |

FOREIGN PATENT DOCUMENTS

| | | | |
|---|---|---|---|
| JP | 10-113138 | * | 5/1998 |
| JP | 11-018702 | * | 1/1999 |
| JP | 2001-211842 | * | 8/2001 |
| JP | 2002-027928 | * | 1/2002 |

* cited by examiner

*Primary Examiner*—James Mackey
(74) *Attorney, Agent, or Firm*—Manabu Kanesaka

(57) ABSTRACT

Provided is a cooked rice mold apparatus that can easily adjust the supply amount of sushi rice. The roller spacing of a top rolling roller pair 31 arranged on the exit side of a hopper 2 of a rolling section 4 is variable.

4 Claims, 7 Drawing Sheets

COOKED RICE MOLD APPARATUS

TECHNICAL FIELD

The present invention relates to a cooked rice mold apparatus that rolls up cooked rice rolled in plate shape into the shape of a rod and, more particularly, to a cooked rice mold apparatus whose maintainability is improved by reducing the number of parts and which can make rolled sushi that resembles hand-rolled sushi more than before.

BACKGROUND ART

To mass produce norimaki (sushi rice, or vinegared rice and ingredients rolled in dry layer), there has been proposed a cooked rice mold apparatus as disclosed in Japanese Patent Application Publication No. 2002-45129, for example. In this cooked rice mold apparatus, cooked rice supplied from a hopper into which sushi rice, or rice seasoned with vinegar is charged is first shaped by a rolling section into the shape of a plate and then spread over dry layer placed on a rolling-up bamboo plate, and the sushi rice, or the rice seasoned with vinegar is rolled in dry layer into the shape of a rod by deforming the rolling-up bamboo plate in cylindrical form.

With this apparatus, everyone can easily make norimaki (vinegared rice and ingredients rolled in dry layer) without the need of skills of sushi chefs, simply by placing layer on the rolling-up bamboo plate, putting ingredients on the sushi rice or the rice seasoned with vinegar that is automatically supplied, and operating buttons.

In Japanese Patent Application Publication No. 2002-45129 above, the rolling-up bamboo plate is composed by rotatably connecting four plate members, and these plate members are connected by use of a link arm so that plate-like pieces on both sides are folded up so as to be opposed to each other, whereby a cylindrical space for rolling up the sushi rice, or the rice seasoned with vinegar is formed inside.

In this type of a cooked rice mold apparatus, it is necessary to change the supply amount of sushi rice according to the thickness of rolled sushi. In the above-described conventional apparatus, which has a first rolling roller pair and a bottom rolling roller pair arranged at two levels of a rolling section, the supply amount has been adjusted by adjusting the roller spacing of the bottom rolling roller pair on the downstream side, with the roller spacing of the top rolling roller pair on the upstream side kept constant.

In the conventional cooked rice mold apparatus, however, because the roller spacing of the top rolling roller pair on the upstream side is constant, the supply amount of sushi rice retained in the rolling section is constant. Therefore, even when the roller spacing in the bottom rolling roller pair is made wide, it has been difficult to adjust the supply amount because of low density of sushi rice, although the sushi rice becomes seemingly thick.

In order to increase the density of sushi rice, more sushi rice is supplied to the bottom rolling roller pair on the downstream side by either increasing the rotation speed of the top rolling roller pair on the upstream side or reducing the rotation speed of the bottom rolling roller pair. However, when the rotation speed of the top rolling roller pair on the upstream side is increased, fine thickness control is difficult because the flow velocity varies according to the condition of sushi rice (viscosity, moisture and temperature). Furthermore, when the rotation speed of the bottom rolling roller pair is reduced, the molding time becomes long, resulting in a decrease in production.

To solve the above-described problems, therefore, the object of the present invention is to provide a cooked rice mold apparatus that can easily adjust the supply amount of sushi rice.

SUMMARY OF THE INVENTION

To achieve the above object, the present invention has some features described below. In a cooked rice mold apparatus having a rolling section that rolls cooked rice supplied from a hopper into shape of a plate and a molding section that molds the cooked rice rolled by the rolling section into the shape of a rod, the rolling section has at least two roller pairs, i.e., a top rolling roller pair that is arranged on the exit side of the hopper and a bottom rolling roller pair that is arranged downstream of the top rolling roller pair, and the top rolling According to this feature, because the roller spacing of the top rolling roll pair on the upstream side is made variable, it is possible to increase the supply amount of sushi rice buffered in the rolling section, with the result that the sushi rice can be formed thick by increasing the density of the sushi rice.

As a more preferred aspect, also the roller spacing of the bottom rolling roller pair is variable, and the top rolling roller pair and the second roller pair move independently of each other or in synchronization with each other.

According to this aspect, because also the roller spacing of the bottom rolling roller pair is variable, it is possible to more finely adjust the thickness of the sushi rice.

As another aspect, in the rolling roller pairs, one of the rolling rollers is fixed and the other rolling roller moves with respect to one of the rolling roller.

According to this aspect, because one of the rolling rollers is fixed and the other rolling roller is variable, a complex feed mechanism is unnecessary and maintainability is good.

DETAILED DESCRIPTION

Figure 1:
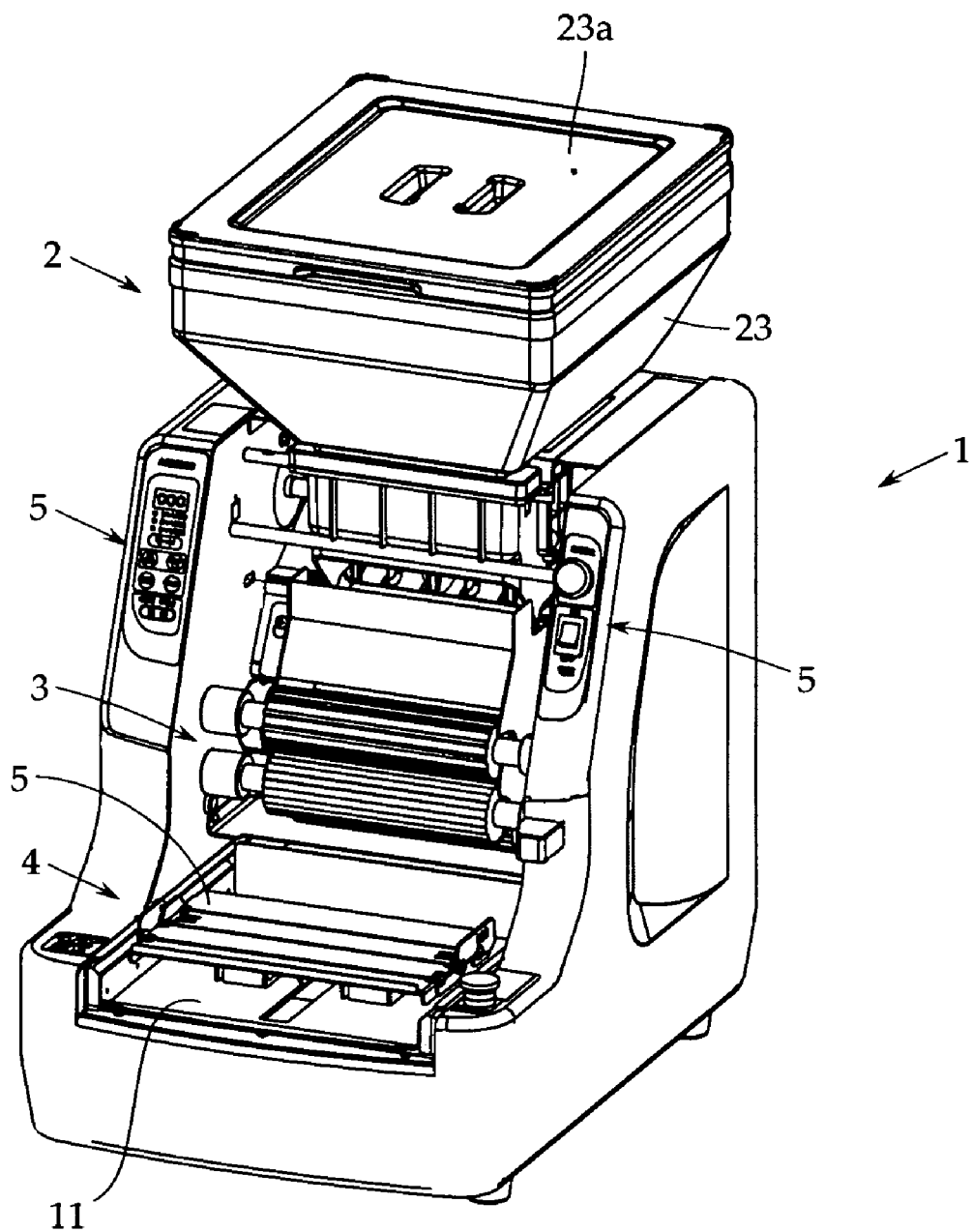
FIG. 1 is a perspective view of a cooked rice mold apparatus in an embodiment of the present invention.

Next, an embodiment of the present invention will be described with reference to the drawings. The present invention, however, is not limited by this embodiment. FIG. 1 is a perspective view of a cooked rice mold apparatus in an embodiment of the present invention and FIG. 2 is a sectional view schematically showing the internal construction of the cooked rice mold apparatus.

Incidentally, in FIG. 1, a front panel is removed so that the positions of the rolling section and the like provided inside can be easily seen. In actuality, however, the front panel is attached and the rolling section cannot be seen.

Figure 2:
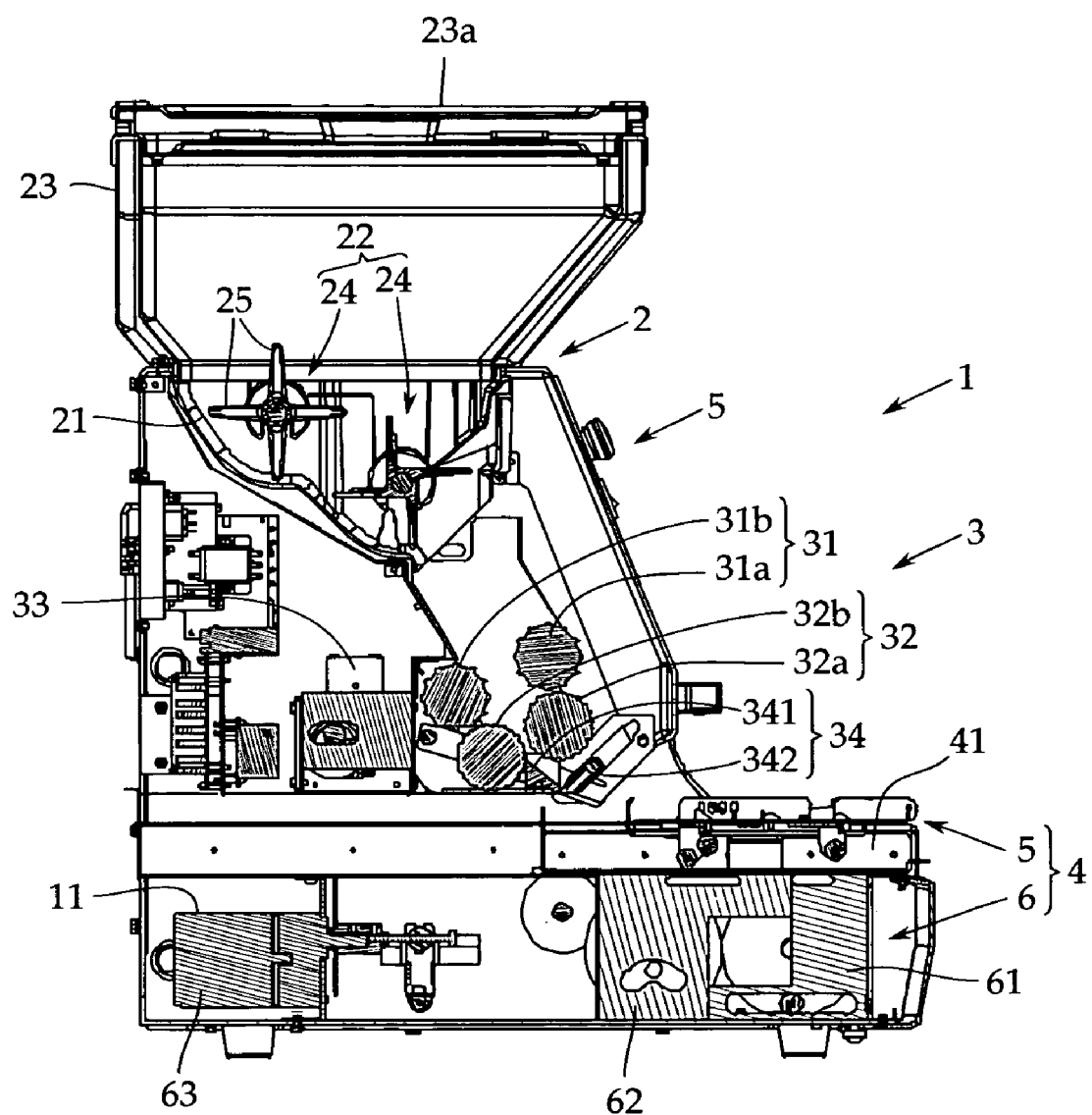
FIG. 2 is a partial sectional view showing the internal construction of the above-described cooked rice mold apparatus.

As shown in FIGS. 1 and 2, this cooked rice mold apparatus 1 is provided with a hopper 2 into which sushi rice is charged, a rolling section 3 that rolls the sushi rice supplied from this hopper 2 into the shape of a plate, and a molding section 4 that molds the sushi rice that has been rolled into the shape of a plate into the shape of a rod.

The cooked rice mold apparatus 1 is provided with an operation panel 5 for operating the cooked rice mold apparatus 1. In this embodiment, the operation panel 5 is provided separately on both sides of the front. On the observer's left, various kinds of setting buttons for setting the supply amount of sushi rice, the number of formed rolled sushi and the like and a display section are provided, whereas on the observer's right, a power supply switch, an emergency stop switch and the like are provided.

The hopper 2 is open toward an upper portion of the apparatus main body and is provided with a retaining portion 21 in which sushi rice is retained and an agitation portion 22 that causes the sushi rice retained in the retaining portion 21 to flow by washing down the sushi rice to the downstream side while agitating the sushi rice. In an upper part of the cooked rice mold apparatus 1, a storage container 23 that supplies sushi rice to the hopper 2 is detachably provided.

The retaining portion 21 is formed in the shape of a funnel whose volume decreases from the top to the bottom of the apparatus main body, and the downstream side is open toward the rolling section 3. The agitation portion 22 has two agitation arms 24 that are rotationally driven via driving means that is not shown, and a plurality of agitation rods 25 are attached to each of the agitation arms 24 at prescribed intervals. In FIG. 2, the agitation arms 24 are driven counterclockwise.

Figure 3:
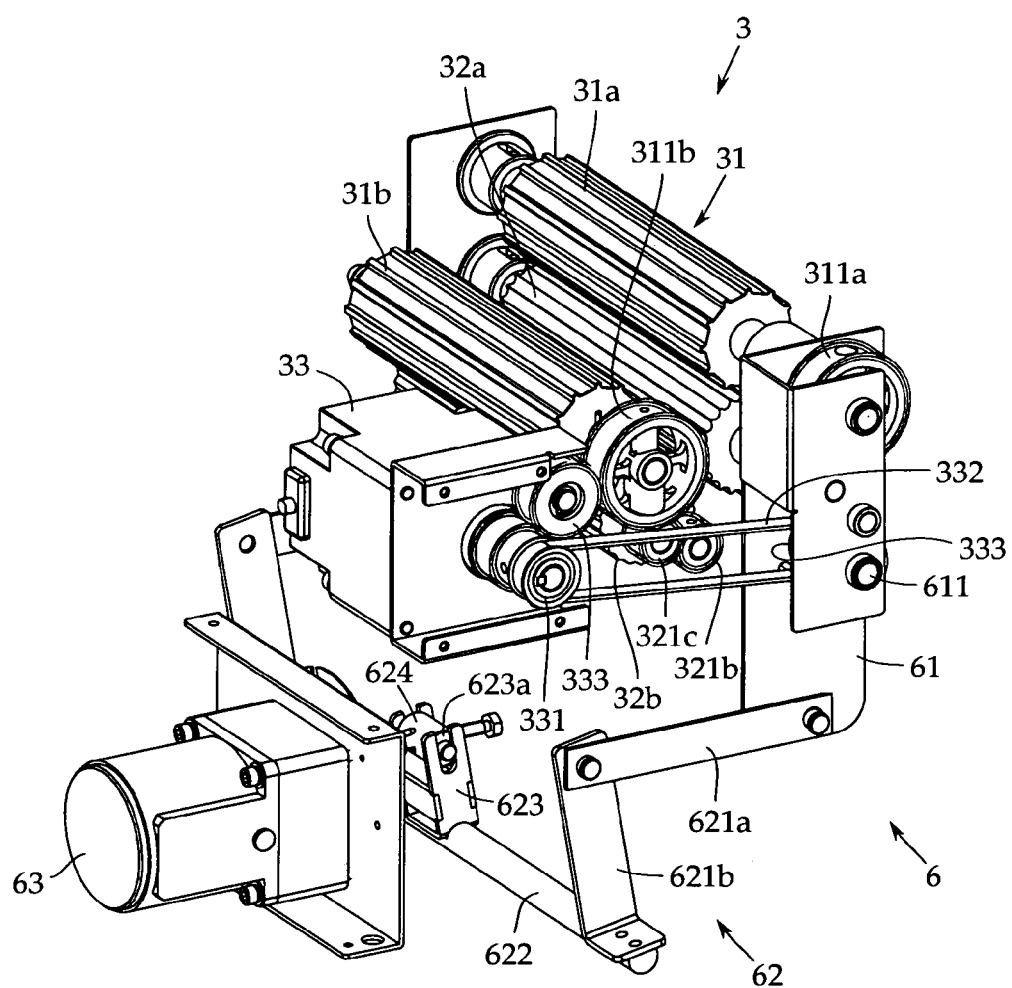
FIG. 3 is a perspective view to explain the construction of a rolling section.

With reference to FIGS. 2 and 3, the rolling section 3 is a two-high rolling section having a top rolling roller pair 31 that rolls sushi rice supplied from the hopper 2 and a bottom rolling roller pair 32 that is arranged on the downstream side (delivery side) of the top rolling roller pair 31 and further rolls the sushi rice rolled by the top rolling roller pair 31. The top rolling roller pair 31 and the bottom rolling roller pair 32 are arranged parallel to each other.

The top rolling roller pair 31 has a first top rolling roller 31a and a second top rolling roller 31b, which are arranged lengthwise (laterally in FIG. 2), with the sushi rice sandwiched and these are arranged in an opposed manner at a prescribed interval.

Both of the first top rolling roller 31a and the second top rolling roller 31b are formed from a molded article of synthetic resin and have the shape of a gear which is such that a large number of ribs are provided on the roller surface at prescribed intervals parallel along the axis line direction.

The bottom rolling roller pair 32 has a first bottom rolling roller 32a and a second bottom rolling roller 32b that are arranged lengthwise (laterally in FIG. 2), with the sushi rice sandwiched and these are arranged in an opposed manner at a prescribed interval.

Also the first bottom rolling roller 32a and the second bottom rolling roller 32b are formed from a molded article of synthetic resin and have the shape of a gear which is such that a large number of ribs are provided on the roller surface at prescribed intervals parallel along the axis line direction.

In the present invention, within the cooked rice mold apparatus 1 there is provided a roller position adjusting portion 6 for varying the roller spacing of the top rolling roller pair 31. As shown in FIGS. 3 and 4, the roller position adjusting portion 6 is provided with a swing arm 61 rotatably attached to the interior of the apparatus main body and a crank arm 62 one end of which is connected to the swing arm 61 and the other end of which is connected to a driving motor 63.

The swing arm 61 has a pair of right and left metal-plate stays and is provided so as to be able to rotate around a rotating spindle 611 provided substantially in the middle. The first top rolling roller 31a is rotatably provided so as to span the right and left metal-plate stays at the top end of the swing arms 61, and a gear 311a is attached to one end of the rotating spindle.

Substantially in the middle of the swing arm 61, the first bottom rolling roller 32a of the bottom rolling roller pair 32 is rotatably supported adjacent to the top side of the rotating spindle 611. A gear that transmits a rotational driving force (not shown) is provided also on the rotating shaft of the first bottom rolling roller 32a.

This gear is caused to engage with the gear 311a of the first top rolling roller 31a and an intermediate gear 333 that is driven by a driving belt 332 connected to a rotating shaft 331 of the driving motor 33. During the output of the driving motor 33, this gear is connected to the gear 311a of the first top rolling roller 31a via the driving belt 332 of the rotating shaft 331. Therefore, the rotational driving force of the driving motor 33 is transmitted in order: driving motor 33→driving belt 332→intermediate gear 333→unillustrated gear→gear 311a.

The crank arm 62 has an L-shaped push rod 621 in which two arms, i.e., a first arm 621a and a second arm 621b are connected together in a bendable manner, and a leading end of the first arm 621a is rotatably connected to a bottom end of the swing arm 61. A leading end of the second arm 621b is fixed to a rotatably driving shaft 622 that is rotatably supported by an unillustrated bearing portion.

In the middle of the rotatably driving shaft 622, there is provided a supporting stay 623 for converting the rotational driving force of the driving motor 63 into a rotation around the rotatably driving shaft 622. The supporting stay 623 is formed from a pair of right and left metal plates arranged parallel to each other at a prescribed interval, and a U-shaped supporting groove 623a for supporting a driven body 624 is provided at a leading end of the supporting stay 623.

The driven body 624 has the shape of a circular cylinder on which a female screw is diametrically formed, and both ends of the driven body 624 are slidably and rotatably supported along the supporting groove 623a. A worm (a male screw) formed on a rotating shaft 631 of the driving motor 63 is screwed into a female screw of the driven body 624.

Figure 4A:
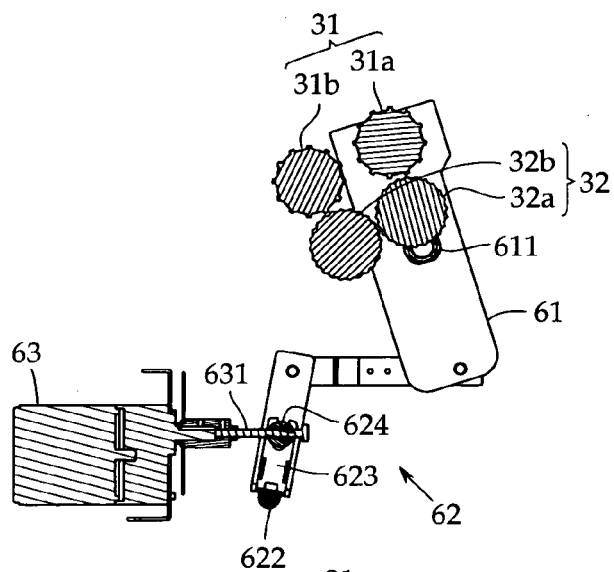
FIGS. 4A to 4C are explanatory views to explain a procedure for adjusting the roller spacing in the rolling section.
Figure 4B:
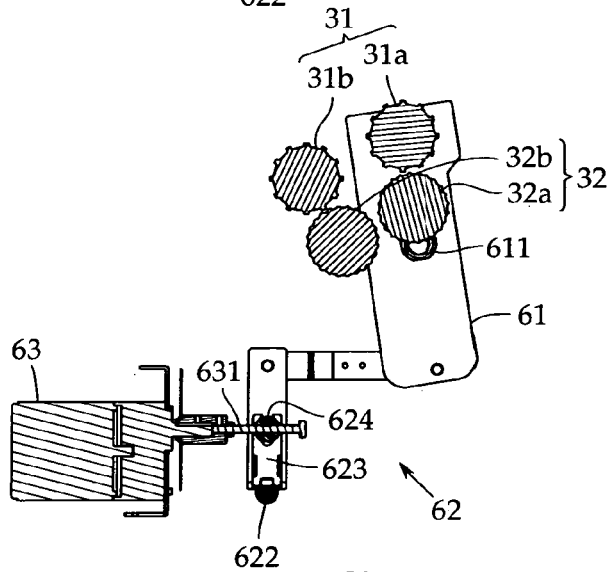
Figure 4C:
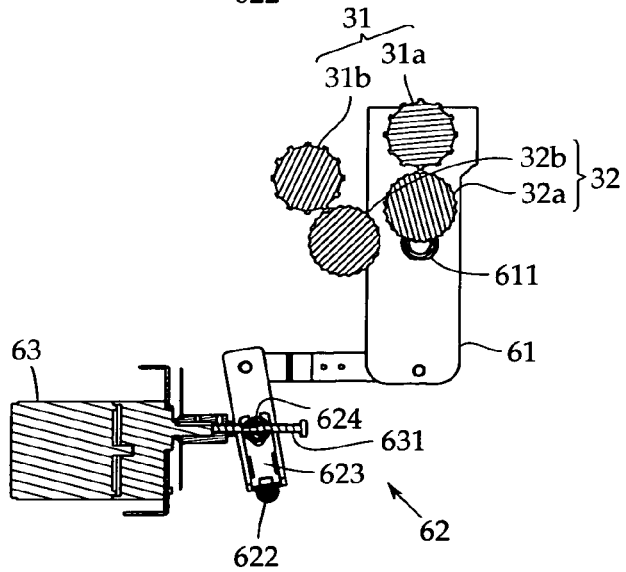

According to this feature, as shown in FIGS. 4A to 4C, when the driving motor 63 is caused to rotate in one direction, the swing arm 62 rotates rightward and the roller spacing of the top rolling roller pair 31 expands. When the driving rotor is caused to rotate in the reverse direction, the swing arm rotates leftward and the roller spacing of the top rolling roller pair 31 becomes narrow.

That is, the driven body 624 is drawn near toward the driving motor 63 side as the driving motor 63 rotates and the supporting stay 623 is drawn near, with the result that the push rod 621 draws the bottom end of the swing arm 61 toward the driving motor 63 side, with the rotatably driving shaft 622 connected to the base of the supporting stay 623 serving as the center.

As a result of this, because the swing arm 61 rotates around the rotating shaft 611 and the first top rolling roller 31a provided on the side of the other end moves in the direction in which the first top rolling roller 31a moves away from the second top rolling roller 31b, the roller spacing expands.

In this embodiment, also the roller spacing of the bottom rolling roller pair 32 changes delicately in association with the swing motion of the swing arm 61, because from a design problem also the first bottom rolling roller 32a is attached to the swing arm 61. However, it is more preferred that the roller spacing be made variable by supporting only the first top rolling roller 31a.

As shown in FIG. 3, the second top rolling roller 31b and the second bottom rolling roller 32b are both rotatably supported by an unillustrated bearing portion of the apparatus main body and gears 311b, 321b are attached to end portions of these rolling rollers. The gear 311b and the gear 321b are connected via an intermediate gear 312c. The gear 311b is connected to an output shaft 331 via an intermediate gear 333.

Again with reference to FIG. 2, downstream of the bottom rolling roller pair 32 is provided a cutting section 34 for cutting rolled sushi rice into prescribed lengths. The cutting section 34 is provided with a guide plate 341 provided adjacent to an outlet of the second bottom rolling roller pair 32a, and a cutting edge 342 that moves toward and away from the guide plate 341 via unillustrated driving means.

As a result of this, the sushi rice rolled by the second rolling roller pair 32 is conveyed to the molding section 4 while moving along the guide plate 341 and when a prescribed length of the sushi rice has been delivered, the cutting edge 342 moves toward the guide plate 341 and the sushi rice is cut.

With reference to FIGS. 1 and 2, the molding section 4 is provided with a molding stage 11. The molding stage 11 is horizontally provided so as to pierce through the apparatus main body from the rear side of the cooked rice mold apparatus 1 toward the front side thereof.

The molding stage 11 is provided with a slider 41 for causing the rolling-up bamboo plate 5 of the molding section 4 to slide back and forth along the molding stage 11, and the rolling-up bamboo plate 5 is fixed to a top surface of the slider 41. The moving means of the slider 41 may be a rack and pinion mechanism or a linear driving system.

Figure 5:
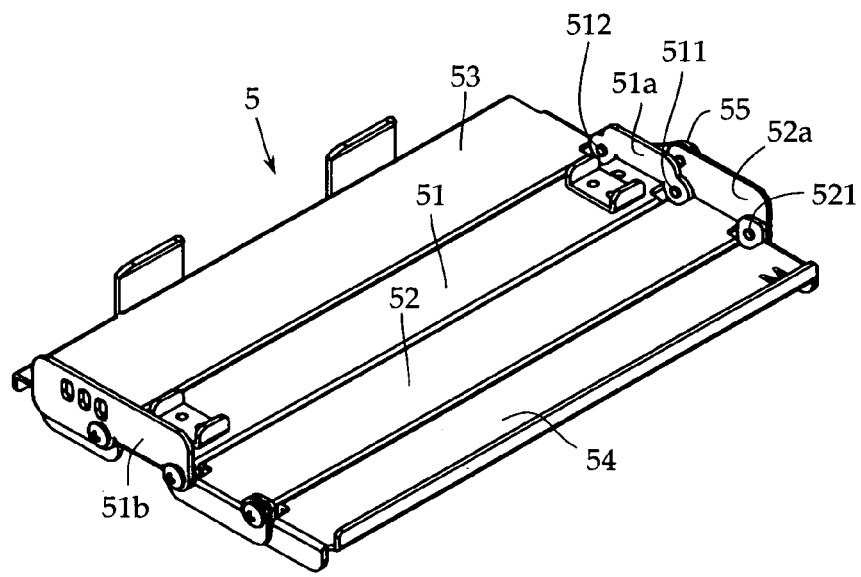
FIG. 5 is a perspective view of a rolling-up bamboo plate of a molding section.
Figure 6A:
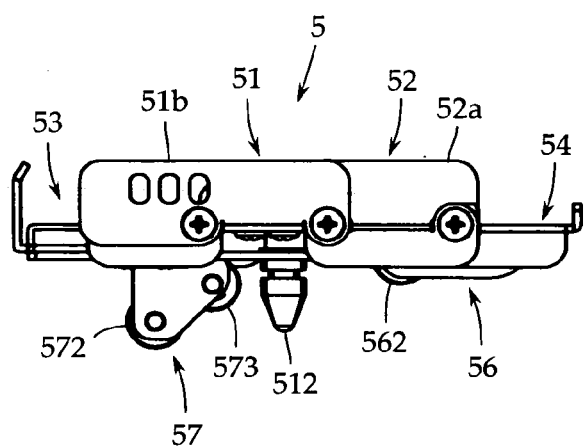
FIG. 6A is a side view of the rolling-up bamboo plate.
Figure 6B:
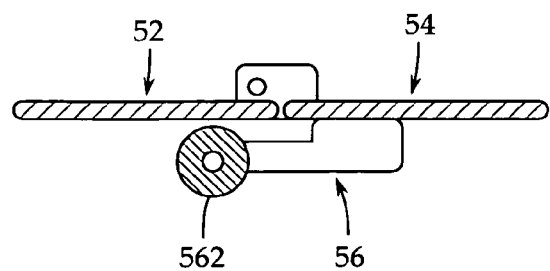
FIG. 6B is a partially enlarged sectional view of a third rotating plate 53.

As shown in FIGS. 5 and 6A and 6B, the rolling-up bamboo plate 5 has a fixed plate 51 that is fixed to the slider 41, a first rotating plate 52 and a second rotating plate 53 that are rotatably connected to both ends of the fixed plate 51 via rotating shafts 511, 512, and a third rotating plate 54 that is rotatably connected to an end portion of the first rotating plate 52 via a rotating shaft 521. In this embodiment, the rolling-up bamboo plate 5 is a rolling-up bamboo plate for thin rolled sushi.

One side surface of the first rotating plate 52 in the longitudinal direction thereof (the vertical direction in FIG. 6A) is provided with a side plate 52a, and one end of a link arm 55 is connected to the side plate 52a. The other end of the link arm 55 is connected to a side surface of the second rotating plate 53 so that the second rotating plate 53 is folded up or deploys by responding to the rotating motion of the first rotating plate 52.

Side plates 51a, 51b are provided at both ends of the fixed plate 51 in the longitudinal direction thereof. On a rear surface (the bottom surface in FIG. 6A) of the fixed plate 51, locking convexities 512 that are inserted into unillustrated locking holes provided in the slider 41 are provided along the longitudinal direction at prescribed intervals in a plurality of places, two places in this embodiment.

On a rear surface of the third rotating plate 54, a first cam member 56 that is pushed up by a first lift plate 61, which will be described later, is integrally formed. On the leading end side of the first cam member 56, a cam roller 562 that moves along a guide surface 611 of the first lift plate 61 is provided. As shown in FIG. 6B, the first cam member 56 is arranged on the rear surface of the first rotating plate 52 when the rolling-up bamboo plate 5 is in a deployed condition.

The cam roller 562 of the first cam member 56 is composed of a magnetic body capable of being magnetically attached to a magnet 71 buried in the guide surface 611. In this embodiment, the first cam member 56 is provided in two places at prescribed intervals in the longitudinal direction.

On a rear surface of the second rotating plate 53, a second cam member 57 that is pushed up by a second lift plate 62, which will be described later, is integrally formed. On the leading end side of the second cam member 57, two cam rollers 572, 573 that move along a guide surface 621 of the second lift plate 62 is provided. One of the cam rollers 572, which is a roller made of resin, is provided on the leading end side of the second cam member 57.

The other cam roller 573 is arranged on the base side of the second cam member 57 and is formed from a magnetic body capable of being magnetically attached to a magnet 72. In this embodiment, the second cam member 57 is provided in two places at prescribed intervals in the longitudinal direction.

Figure 8A:
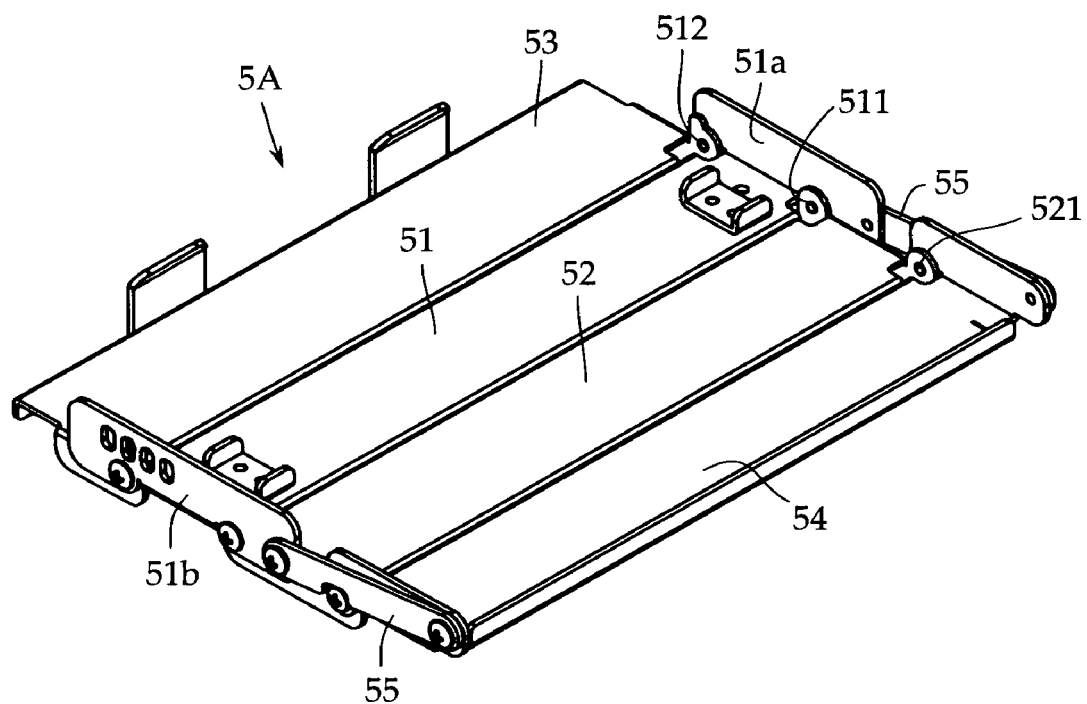
FIG. 8A is a perspective view of a rolling-up bamboo plate for making thick rolled sushi.
Figure 8B:
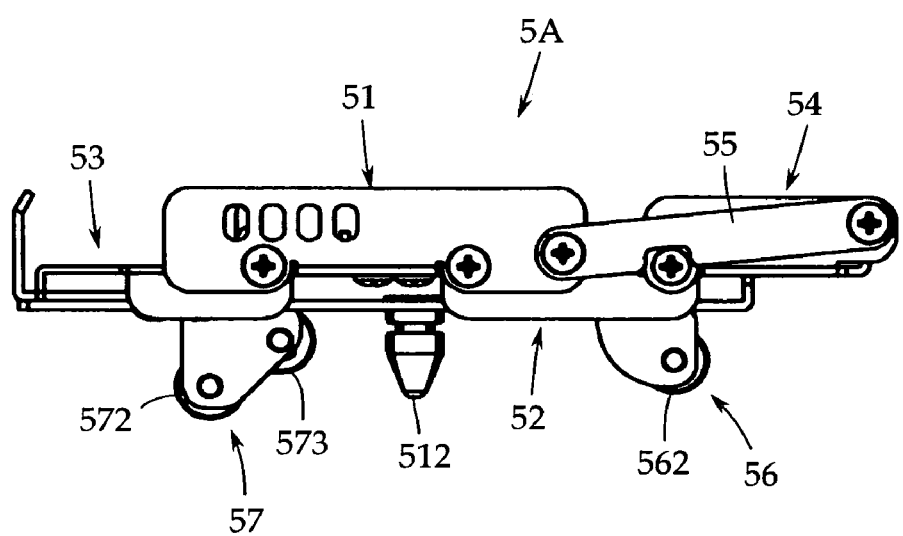
FIG. 8B is a side view of the rolling-up bamboo plate for making thick rolled sushi.

Furthermore, a rolling-up bamboo plate with an increased plate width for thick rolled sushi may also be used. That is, as shown in FIGS. 8A and 8B, in a rolling-up bamboo plate 5A for thick rolled sushi, a link arm 55 connects side surfaces 51a, 51b of a fixed plate 51 and a third rotating plate 54. A second cam member 56 is provided on a rear surface of a first rotating plate 52. Other members are the same as in the above-described rolling-up bamboo plate 5 for thin rolled sushi and hence their descriptions are omitted.

With reference to FIGS. 2 and 7A to 7D, plate driving means 6 for folding the rolling-up bamboo plate 5 is provided within the apparatus main body below the molding stage 11. The plate driving means 6 is provided with a first lift plate 61 and a second lift plate 62 that move vertically toward the rolling-up bamboo plate 5 from the bottom surface of the molding stage 11 each via a driving motor that is not shown in the figure.

Figure 7A:
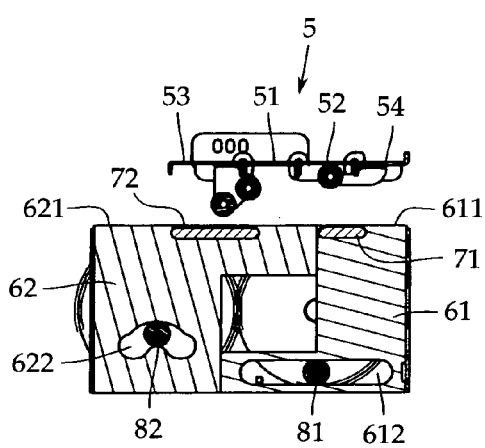
FIGS. 7A to 7D are explanatory views to explain deformation steps of the rolling-up bamboo plate.

As shown in FIG. 7A, the first lift plate 61 is formed from a molded article of synthetic resin having an L-shaped section, and a guide surface 611 that depresses the first cam member 56 is provided on a top end of the first lift plate 61. The guide surface 611 is formed from plane surface that is parallel along the molding stage 11, and the first magnet 71 is buried on the first guide surface 611.

The first magnet 71, which is formed from, for example, a ferritic permanent magnet, is buried in flat shape along an area with which a cam roller 561 of the first cam member 56 comes into sliding contact. Although in this embodiment the first magnet 71 is buried in the first guide surface 611, the first magnet 71 may also be stuck onto the top surface. Furthermore, an electromagnet may be used in place of a permanent magnet.

On the bottom side of the first lift plate 61, a cam follower 612 of a first eccentric cam pin 81 of the driving motor is provided. The cam follower 612 is formed from a groove that is extended along the lateral direction (horizontal direction) in the interior of the first lift plate 61, and the first cam pin 81 is provided so as to come into sliding contact along the interior of the cam follower 612.

The second lift plate 62 is formed from a molded article of synthetic resin having an L-shaped section, and a second guide surface 621 that depresses the second cam member 57 is provided on a top end of the second lift plate 62. The second guide surface 621 is formed from a plane surface that is parallel along the molding stage 11, and the second magnet 72 is buried just under the second guide surface 621.

As with the first magnet 61, also the second magnet 72 is formed from a plate body of a ferritic magnet, and is provided within a region with which the cam roller 573 of the second cam member 57 comes into sliding contact.

On the bottom side of the second lift plate 62, a cam follower 622 of a second eccentric cam pin 82 of the driving motor is provided. The cam follower 622 is formed from an arcuate groove that is extended into the interior of the first lift plate 61, and the second cam pin 82 is provided so as to come into sliding contact along the interior of the cam follower 622.

Next, with reference to FIGS. 1 to 7A to 7D, a description will be given of an example of a procedure for using this cooked rice mold apparatus 1. First, upon turning on a power supply switch provided on the operation panel 5, the agitation rod 24 in the hopper 2 begins to rotate. Sushi rice that has been mixed with sushi vinegar beforehand is put into the hopper 2.

The sushi rice put into the hopper 2 is supplied to the top rolling roller pair 31 of the rolling section 3 while being disintegrated by the agitation arm 24. Next, the operator operates the operation panel 5 and sets the thickness and quantity of rolled sushi.

Upon setting of the thickness of rolled sushi, an unillustrated control section issues a command to the driving motor 63 of the rolling section 3 and as a result of this, the driving motor 63 starts rotating in a prescribed direction. The swing arm 61 rotates as the driving motor 63 rotates, and the first top rolling roller 31a moves in a direction in which the first top rolling roller 31a moves away from or approaches the second top rolling roller 31b. The driving motor 63 stops automatically when a roller spacing that is set beforehand by a program is reached.

Next, upon depressing an unillustrated rolling start button of the operation panel 5, the control section issues a command to the rolling section 3 and causes the top rolling roller pair 31 and the bottom rolling roller pair 32 to rotate. In this embodiment, the first top rolling roller 31a and the first bottom rolling roller 32a rotate counterclockwise and the second top rolling roller 31b and the second bottom rolling roller 32b rotate clockwise.

The sushi rice that has entered the rolling section 3 is first roughly rolled by the top rolling roller pair 31, fed into the next bottom rolling roller pair 32 and formed into a high-density plate-like object by the bottom rolling roller pair 32.

Simultaneously the control section issues a command to the driving motor of the slider 41 of the molding stage 11 and causes the slider 41 to be on standby, with the third rotating plate 54 of the rolling-up bamboo plate 5 positioned under the rolling section 3.

When the sushi rice has flowed by being pushed from the downstream side of the rolling section 3, the control section causes the rolling-up bamboo plate 5 to slide forward (in the rightward direction in FIG. 2) in accordance with the flow velocity of the sushi rice, and spreads the sushi rice over the rolling-up bamboo plate 5. When a prescribed length of the sushi rice has been delivered, the control section pushes out the cutting edge 642, which cuts the sushi rice.

Incidentally, when norimaki, or vinegared rice and ingredients rolled in dry layer is to be made, a sheet of dry layer is placed beforehand on the rolling-up bamboo plate 5. In making rolled sushi except norimaki, it is preferred that a cover sheet made of resin be placed beforehand on the rolling-up bamboo plate 5.

When the sushi rice has been supplied onto the rolling-up bamboo plate 5, the cooked rice mold apparatus 1 comes to a standby condition for a while. During this standby time, the operator applies wasabi, or grated Japanese horseradish to the sushi rice and places ingredients. When the arrangement of the ingredients has been completed, the operator depresses an unillustrated rolling-up, step start button of the operation panel 5. Incidentally, in place of depressing the rolling-up step start button, it is also possible to adopt timer control that involves automatically a shift to the rolling-up step after a lapse of a given time following the finish of the rolling step.

When the rolling-up step has been started, first the control means ascertains whether the rolling-up bamboo plate 5 is in a prescribed position on the plate driving means 6, as shown in FIG. 7A. When this ascertainment is finished, the control means issues a command to each driving motor of the plate driving means 6.

Figure 7B:
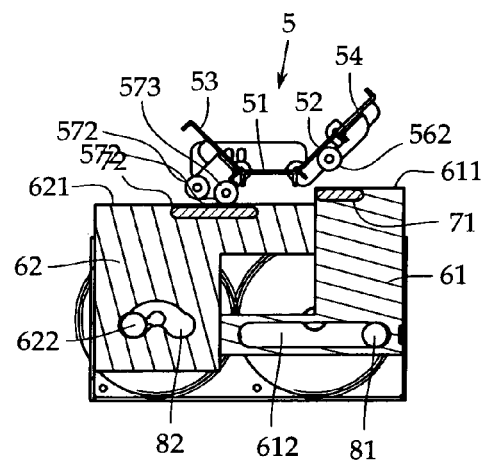

Each of the eccentric cam pins 81, 82 rotates as each of the driving motors rotates. As shown in FIG. 7B, the first centric cam pin 81 moves along the interior of the first cam follower 612 and pushes up the first lift plate 61. Simultaneously also the second eccentric cam pin 82 moves along the interior of the second cam follower 622 and pushes up the second lift plate 61.

When the first lift plate 61 ascends, the first cam member 56 of the third rotating plate 54 abuts against the guide surface 611 of the first lift plate 61 and is pushed up. As a result of this, also the first rotating plate 52 is lifted up.

When the second lift plate 62 ascends, first the cam roller 572 of the second cam member 67 of the second rotating plate 53 abuts against the guide surface 621 and is pushed up. As a result of this, the second rotating plate 53 becomes lifted up gradually.

When the second lift plate 62 ascends further, the cam roller 572 moves away from the guide surface 621 and the next cam roller 573 comes into contact with the guide surface. When the second lift plate 62 is lifted up to the highest position in this state, as shown in FIG. 7C, the second rotating plate 53 comes into a condition upright with respect to the fixed plate 51.

Figure 7C:
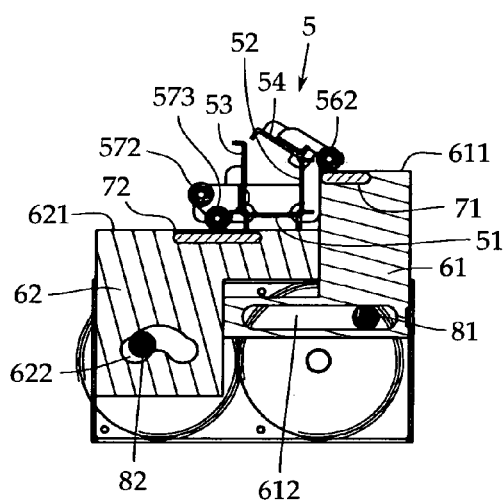
Figure 7D:
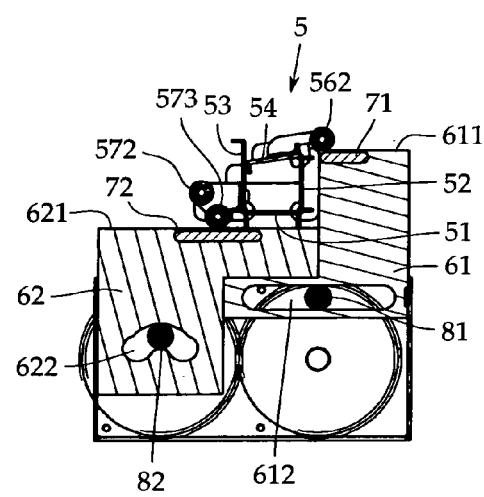

On the other hand, as shown in FIG. 7C, while the first lift plate 61 is being lifted up to the highest position, the first rotating plate 52 stops in a condition upright with respect to the fixed plate 51.

When the first lift plate 61 continues ascending and is lifted up to the highest position, the third rotating plate 54 is pushed into the Π-shaped internal space formed by the fixed plate 51, the first rotating plate 52 and the second rotating plate 83 and is folded.

As a result of this, the sushi rice placed on the rolling-up bamboo plate 5, along with the ingredients, is molded in the shape of a bar, and pushed down from above by the third rotating plate 54, whereby the sushi rice is rolled and fastened and molded into rolled sushi having the shape of a complete bar.

Incidentally, in order to give the appearance of hand rolling to rolled sushi, it is also possible to adopt a method that involves causing the driving motor of the first lift plate 61 to rotate temporarily in the reverse direction, repeating rotation again in the ascent direction, and repeating the rolling and fastening step of the third rotating plate 54.

In this rolling and fastening step, it is ensured that the position of the second rotating plate 53 does not return even when the rolling and fastening step is repeated by repeatedly moving the first lift plate 61 up and down, because the cam follower 622 of the second lift plate 52 is formed in the shape of a circular arc. Incidentally, it is preferred that the frequency of repetition of the rolling and fastening step be capable of being set from the operation panel 5.

When rolling and fastening is finished, the control section causes the driving motor to rotate in the reverse direction, thereby causing the first lift plate 61 and the second lift plate 62 to descend. At this time, the cam roller 562 of the third rotating plate 54 and the cam roller 573 of the second rotating plate 53 have been magnetically attached to the first lift plate 61 and the second lift plate 62 by the magnets 71, 72 embedded in the first and second lift plates 61, 62.

As a result of this, the third rotating plate 54 and the second rotating plate 53 begin to deploy again to their original positions as the first lift plate 61 and the second lift plate 62 descend, and the first lift plate 61 and the second lift plate 62 return to their initial positions and come to the initial condition (deployed condition) shown in FIG. 7A.

When a series of operations are finished, the cooked rice mold apparatus 1 comes to a standby condition again. Eventually, the operator recovers the norimaki, or vinegared rice and ingredients rolled in dry layer molded in rod shape on the rolling-up bamboo plate 5, whereby the series of work steps are all finished. A plurality of rolled sushi can be made by repeating the above-described process.

In this embodiment, the cooked rice mold apparatus 1 rolls sushi rice in the rolling section 3 and molds the rolled sushi rice in the molding section 4. However, the cooked rice mold apparatus 1 may also be further provided with an ingredient charging device, a collection device that automatically collects the rolled-up sushi rice and the like, and these modifications are included in the present invention so long as the cooked rice mold apparatus of these modifications has the basic construction of the present invention.

The present application is based on, and claims priority from, Japanese Application Serial Number JP2007-050078, filed Feb. 28, 2007, the disclosure of which is hereby incorporated by reference herein in its entirety.

The invention claimed is:

1. A cooked rice mold apparatus comprising:
a hopper for receiving and holding cooked rice,
a rolling section disposed under the hopper for rolling the cooked rice supplied from the hopper into a flat elongated shape, and
a molding section for shaping the cooked rice rolled by the rolling section into a rod shape,
wherein the rolling section comprises:
a top rolling roller pair arranged on an exit side of the hopper and having first and second rollers arranged parallel to each other,
a bottom rolling roller pair arranged at a downstream side of the top rolling roller pair and having third and fourth rollers arranged parallel to each other,
a swing arm rotationally supported on a frame at a spindle, said first and third rollers being rotationally supported on the swing arm on an upper side thereof relative to the spindle so that spaces of the first and third rollers are variable relative to the second and fourth rollers,
a crank arm connected to a lower side of the swing arm relative to the spindle, and rotationally supported on a shaft,
a supporting stay connected to the shaft of the crank arm, and having a driven body rotatably attached to the supporting stay, said driven body having a female screw, and
a motor having a worm gear engaging the female screw of the driven body to move the crank arm back and forth so that the swing arm moves back and forth to thereby change the spaces of the first and third rollers relative to the second and fourth rollers.

2. The cooked rice mold apparatus according to claim 1, wherein said swing arm comprises a pair of swing arms for supporting two sides of the first and third rollers, and said crank arm comprises a pair formed of first and second arms and connected to the pair of swing arms, each of said second arms being connected at one side to each of the first arms and at the other side to the shaft.

3. The cooked rice mold apparatus according to claim 2, wherein said second and fourth rolling rollers are fixed to the frame.

4. The cooked rice mold apparatus according to claim 1, wherein said molding section comprises a rolling-up plate having a plurality of plate sections bendably connected to each other and cam members disposed under the rolling-up plate, a first lift plate disposed under the rolling-up plate and having a magnet to attract one of the cam members and a first cam follower, a first eccentric cam pin engaging the first cam follower, a second lift plate situated adjacent to the first lift plate and having a magnet to attract another of the cam members and a second cam follower, and a second eccentric cam pin engaging the second cam follower, said first and second eccentric cam pins being rotated to move the first and second lift plates to shape the cooked rice into the rod shape by the rolling-up plate.

* * * * *